United States Patent [19]

Hayashi

[11] Patent Number: 4,555,240
[45] Date of Patent: Nov. 26, 1985

[54] PULLEY FOR COGGED BELT AND METHOD FOR PRODUCING SAME

[75] Inventor: Yoshimasa Hayashi, Yokosuka, Japan

[73] Assignee: Nissan Motor Co., Ltd., Yokohama, Japan

[21] Appl. No.: 360,423

[22] Filed: Mar. 22, 1982

[30] Foreign Application Priority Data

Mar. 23, 1981 [JP] Japan .................... 56-40430[U]

[51] Int. Cl.$^4$ .................... F16H 55/30; F16H 55/12
[52] U.S. Cl. .................... 474/152; 474/164; 74/449
[58] Field of Search ............. 474/152, 153, 164, 165, 474/204, 205; 74/439, 445, 449

[56] References Cited

U.S. PATENT DOCUMENTS

| | | | | |
|---|---|---|---|---|
| 1,017,152 | 2/1912 | Johnson | ............... | 74/449 |
| 1,771,370 | 7/1930 | Benge | ............... | 74/449 |
| 1,852,814 | 4/1932 | Mansur | ............... | 74/445 |
| 1,852,815 | 4/1932 | Mansur | ............... | 74/445 |
| 2,729,110 | 1/1956 | Killian et al. | . | |
| 2,931,094 | 4/1960 | Teerlink | . | |
| 3,990,136 | 11/1976 | Hishida | ............... | 74/439 |

FOREIGN PATENT DOCUMENTS

| 81141 | 5/1894 | Fed. Rep. of Germany | ........ 74/449 |
|---|---|---|---|
| 133880 | 6/1929 | Switzerland | . |
| 1142414 | 2/1969 | United Kingdom | . |

Primary Examiner—John E. Murtagh
Assistant Examiner—Andrew Joseph Rudy
Attorney, Agent, or Firm—Schwartz, Jeffery, Schwaab, Mack, Blumenthal & Evans

[57] ABSTRACT

A pulley for use with a cogged belt, comprises first and second discs formed of sheet metal and secured with each other as a single unit, each disc being formed at its peripheral section with a plurality of teeth, the teeth of the first and second discs being so bent that the bent portion of each tooth of the first disc and the same of the second disc project in the opposite direction to each other, thereby greatly lightening the weight of the pulley to suppress the noise generation due to the vibration of a crankshaft and a camshaft of an engine.

4 Claims, 7 Drawing Figures

PULLEY FOR COGGED BELT AND METHOD FOR PRODUCING SAME

BACKGROUND OF THE INVENTION

1. Field of the Invention

This invention relates to an improvement in a pulley for use with a cogged belt and employed for driving, for example, a camshaft of an automotive internal combustion engine, and in a method of producing the pulley.

2. Description of the Prior Art

Conventional pullies for use with cogged belts are usually produced by machining raw metal material to produce a relatively thick product in order to obtain sufficient mechanical strength. However, such a thick pulley is larger in weight and therefore acts as an additional mass on a crankshaft and a camshaft. As a result, a baneful influence is exerted on the vibration of the shafts, thereby promoting noise generation from systems including the shafts.

BRIEF SUMMARY OF THE INVENTION

According to an aspect of the present invention, a pulley for use with a cogged belt, comprises first and second discs which are formed of sheet metal and secured with each other as a single unit. Each disc is formed at its peripheral section with a plurality of teeth. The teeth of the first and second discs are so bent that the bend portion of each tooth of the first disc and the same of the second disc project generally in opposite directions to each other. The thus arranged pulley is light in weight as compared with conventional similar pullies, thereby preventing considerable mass from being added to the crankshaft and the camshaft. This effectively suppresses to a minimum level the baneful influence applied to the vibration of the crankshaft and the camshaft, thus preventing noise generation from the engine.

According to another aspect of the present invention, the above-mentioned pulley is produced by a method comprising the following steps: (1) producing first and second discs formed of sheet metal; (2) forming a plurality of teeth at the peripheral section of each of the first and second discs; (3) bending each tooth of the first and second discs so that the bent portion of each tooth of the first disc and the same of the second disc project generally in the opposite direction to each other; (4) superposing the first disc on the second disc so that the first and second discs are located generally symmetrical with each other; and (5) uniting the first and second discs at their main body.

BRIEF DESCRIPTION OF THE DRAWINGS

The feature and advantages of the pulley according to the present invention will be more appreciated from the following description in conjunction with the accompanying drawings in which like reference numerals designate like parts and elements, in which.

DETAILED DESCRIPTION OF THE INVENTION

Figure 1:
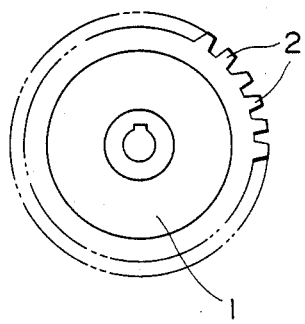
FIG. 1 is a front elevation of a conventional pulley for use with a cogged belt.
Figure 2:
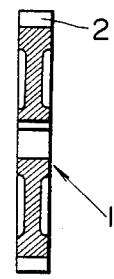
FIG. 2 is a cross-sectional view of the pulley of FIG. 1.

To facilitate understanding the present invention, a brief reference will be made to a conventional pulley for use with a cogged belt (not shown), depicted in FIGS. 1 and 2. Referring to FIGS. 1 and 2, the pulley 1 is produced by rolling or hobbing a raw material, otherwise by die-casting sintering metal or the like into a predetermined shape.

However, with such a conventional pulley for use with a cogged belt, it is necessary to increase the thickness of not only its boss section and its outer peripheral section where teeth are formed but also the entire pulley. This increase in thickness is necessary due to the in production method employed, and in order to obtain a predetermined strength. This unavoidably and directly provides an additional mass on a crankshaft and a camshaft, while contributing to an increase in weight and material cost. As a result, a baneful influence is exerted on the vibration of systems including the crankshaft and the camshaft. In the case where the baneful influence is extreme, the natural frequency in the torsional vibration of the system is lowered to the engine resonance vibration, thereby promoting the generation of engine noise.

Figure 3:
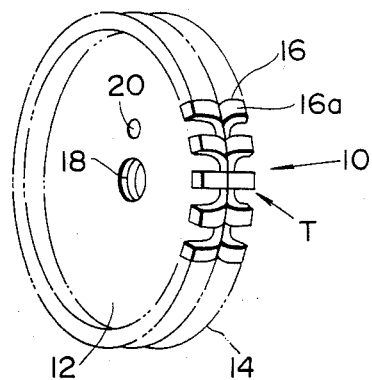
FIG. 3 is a perspective view of a preferred embodiment of a pulley for use with a cogged pulley, in accordance with the present invention.
Figure 4:
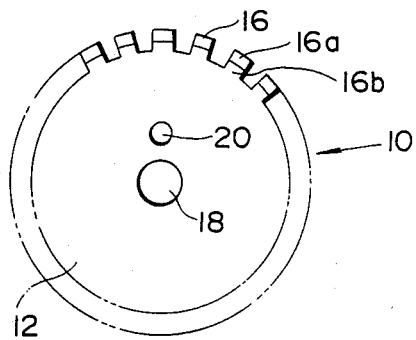
FIG. 4 is a front elevation of the pulley of FIG. 3.
Figure 5:
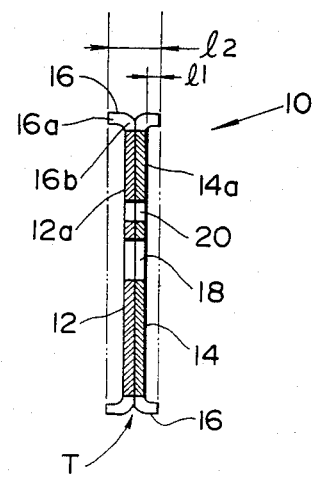
FIG. 5 is a cross-sectional view of the pulley of FIG. 3.

In view of the above description of the conventional pulley for use with a cogged belt, reference is made to FIGS. 3 to 5, wherein a preferred embodiment of a pulley for use with a cogged belt (not shown) is illustrated by the reference numeral 10. The pulley 10 comprises first and second discs 12, 14 which are formed of sheet metal are independent from each other but securely connected with each other at their back or flat main body 12a, 14a to form a single unit. As shown, the first and second discs 12, 14 are united coaxially and generally symmetrical with each other. Each disc is formed at its peripheral section with a plurality of teeth 16 which are located at equal intervals throughout the entire periphery of the disc. The tip portion 16a of each tooth 16 is bent as to extend outwardly in the direction generally perpendicular to the flat main body 12a, 14a of the disc 12, 14, thus constituting an overhang having a dimension $l_1$. It will be understood that each tooth 16 includes a radially and outwardly extending base portion 16b. Additionally, it will be understood that the tip portions 16a of the corresponding and facing teeth of the first and second discs 12, 14 extend symmetrically in opposite directions to each other, thus forming a combined tooth T which is generally T-shaped in cross section as illustrated in FIG. 5 where the width of tooth T is indicated by $l_2$. Each disc 12, 14 is formed with a central hole 18 for connection with a crankshaft (not shown) or a camshaft (not shown), and with a hole 20 used for locating purposes. Hole 20 is positioned in the vicinity of the central hole 18.

Figure 6:
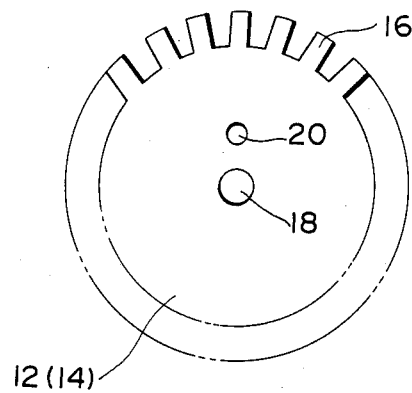
FIG. 6 is a front elevation of a disc with teeth before being bent.

The above-mentioned pulley 10 is, for example, produced as follows: First, each disc 12, 14 is made by stamping out a raw material sheet metal using a press die so that the teeth 16 are formed at the peripheral section of the disc 12, 14 as shown in FIG. 6. Otherwise, the teeth 16 may be formed by machining or cutting the peripheral section after each disc without teeth is stamped out. Subsequently, the tip portion 16a of each tooth 16 is bent outwardly, and thereafter the first and second discs 12, 14 are superposing at their back or main body 12a, 14a one on another in such a manner that the first and second discs 12, 14 are generally symmetrical with each other so that the bent tip portions 16a of the corresponding and facing teeth of the first and second discs 12, 14 extend in opposite direction to each other and are aligned with each other to constitute the above-mentioned combined tooth T which is parallel with the axis of the central opening 18. In this state, the first and second discs 12, 14 are united with each other by means of welding or the like, thus obtaining the pulley 10 for use with the cogged belt.

In locating the teeth 16 so that the tip portions 16a of the corresponding teeth of the first and second discs 12, 14 are in alignment with each other, the opening 20 for locating purpose may be used as a standard. Additionally, the thus located first and second discs 12, 14 may be temporarily connected with each other by means of spot-welding prior to the permanent uniting by the above welding.

With the thus arranged pulley 10, the overhang indicated by the dimension $l_1$ in FIG. 5 can be made smaller. In this connection, since the first and second discs 12, 14 are superposed one on another, the pulley 10 is improved in rigidity as a whole through the above-mentioned dimension $l_1$ is smaller. Furthermore, the dimension $l_2$ indicated in FIG. 5 corresponds to the width of the tooth T which is in engagement with the cogged belt (not shown), thereby effectively preventing the cogged belt from disengaging therefrom. Moreover, it is preferable to interpose between the first and second discs 12, 14 a material high in vibration-damping capacity, for example, hard rubber or urethane resin, thereby effectively suppressing noise generation even if the vibration of the engine itself is transmitted to the pulley 10. It is also preferable that the discs 12, 14 are formed of so-called noise-suppression steel sheet made of ferromagnetic material, in order to further reduce its vibration level.

Figure 7:
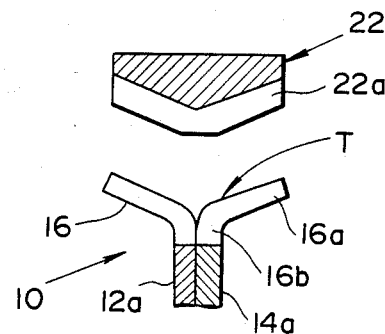
FIG. 7 is a fragmentary sectional view showing another embodiment of the pulley in accordance with the present invention.

FIG. 7 shows another embodiment of the pulley in accordance with the present invention, in which the tip portion 16a of each tooth 16 is so bent that an obtuse angle is formed between the tip portion 16a and the flat main body 12a, 14a. Accordingly, the tooth T constituted by the corresponding and facing teeth 16 becomes generally Y-shaped in cross-section as a whole. With this configuration, the cogged belt 22 can be effectively prevented from displacing in its lateral direction or the axial direction of the pulley 10, which is very effective for preventing the belt 22 from disengaging from the teeth T of the pulley 10. This permits the strength of the belt 22 itself to be increased, thereby suppressing the vibration of the belt itself. In this case, in order to further increase such an effect, it is preferable that the tooth section 22a of the belt 22 is formed of a material which is high in damping capacity, for example, natural rubber.

It will be appreciated that, in all the above-mentioned embodiments, the teeth T may be finished by machining, particularly cutting or rolling, before and after the first and second discs 12, 14 are united as a single unit upon bending of the teeth 16 of each discs 12, 14, thereby improving the finishing accuracy of pulley teeth T. In this case, although machining must be carried out, the machining is so simple and light as to merely modify the shape of the teeth which have been already formed, and therefore it is sufficient that the steps for production are noticeably less.

As appreciated from the above, according to the present invention, the pulley is produced by superposing the discs formed of sheet metal so that the discs are united to form a single unit. This greatly contributes to the weight-lightening of the pulley itself and accordingly to the weight-lightening of the engine, thereby suppressing to the minimum level the baneful influence upon the vibration characteristics of the crankshaft and the camshaft. Particularly in case where a high damping capacity material is interposed between a pair of the discs, the vibration of the pulley itself is effectively suppressed, thus preventing noise generation due to the pulley movement.

What is claimed is:

1. In combination, a pulley for use with a cogged belt, and a cogged belt, said cogged belt having sides and cogs extending from one of said sides to the other of said sides, said pulley comprising:

first and second discs formed of sheet metal and secured with each other as a single unit, each disc being formed at its peripheral section with a plurality of teeth and having a main body, each tooth including a base portion integral with and extending radially outwardly from said main body, and a bent portion integral with said base portion, said discs being secured such that the bent portions of the teeth on said first and second discs extend in generally opposite directions, and such that said bent portions are engageable with said cogs of said cogged belt, said opposed bent portions and radially outwardly extending base portions of each tooth defining a continuous contact surface whereby there is engagement of each tooth with a cog of said belt across the full extent of each tooth.

2. A pulley as claimed in claim 1, wherein said first and second discs are disposed generally symmetrical with other, in which each tooth bent portion of the first disc and the same of said second disc are aligned in the direction of the axis of said first and second disc to form a combined tooth.

3. A pulley as claimed in claim 1, wherein each tooth of said first and second discs is so bent that a generally right angle is formed between said tooth bent portion and the flat surface of said disc main body so that said combined tooth is generally T-shaped in cross-section.

4. A pulley as claimed in claim 1, wherein each tooth of said first and second discs is so bend that an obtuse angle is formed between said tooth bend portion and the flat surface of said disc main body so that said combined tooth is generally Y-shaped in cross-section.

* * * * *